March 21, 1967     H. H. HAAS     3,310,042
ROTARY PISTON INTERNAL COMBUSTION ENGINE
Filed Nov. 29, 1962     8 Sheets-Sheet 1
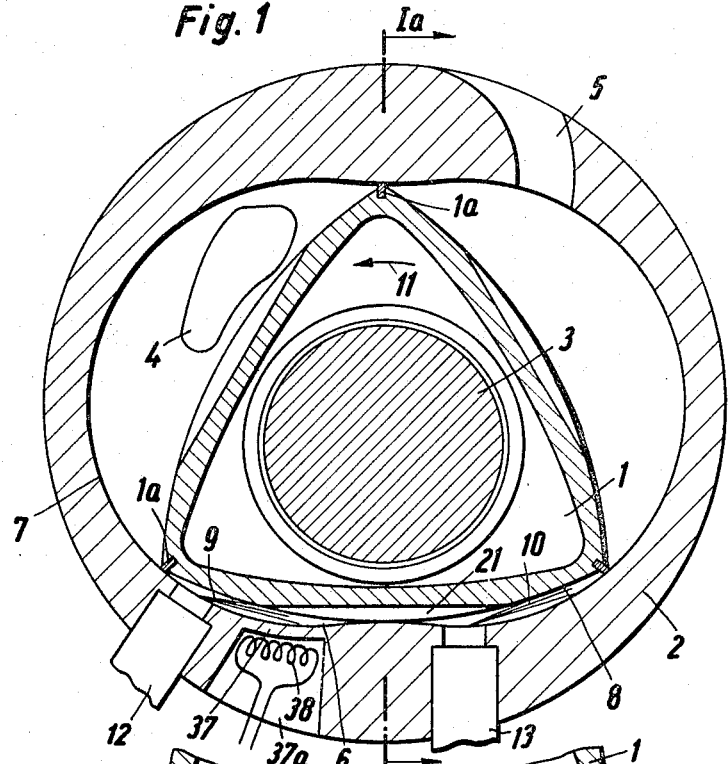
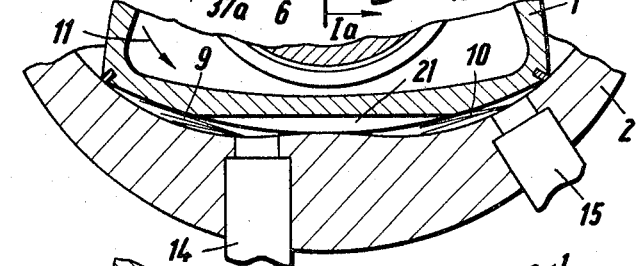
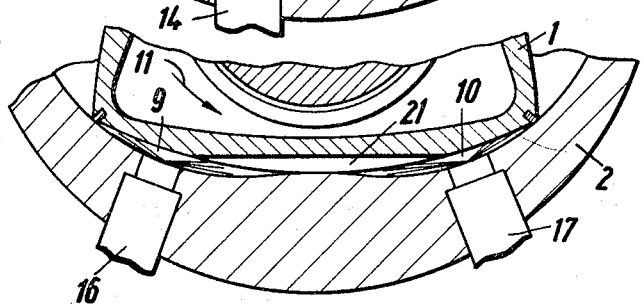
Inventor:
Herbert H. Haas
By Walter Becker Inventor:
Herbert H. Haas

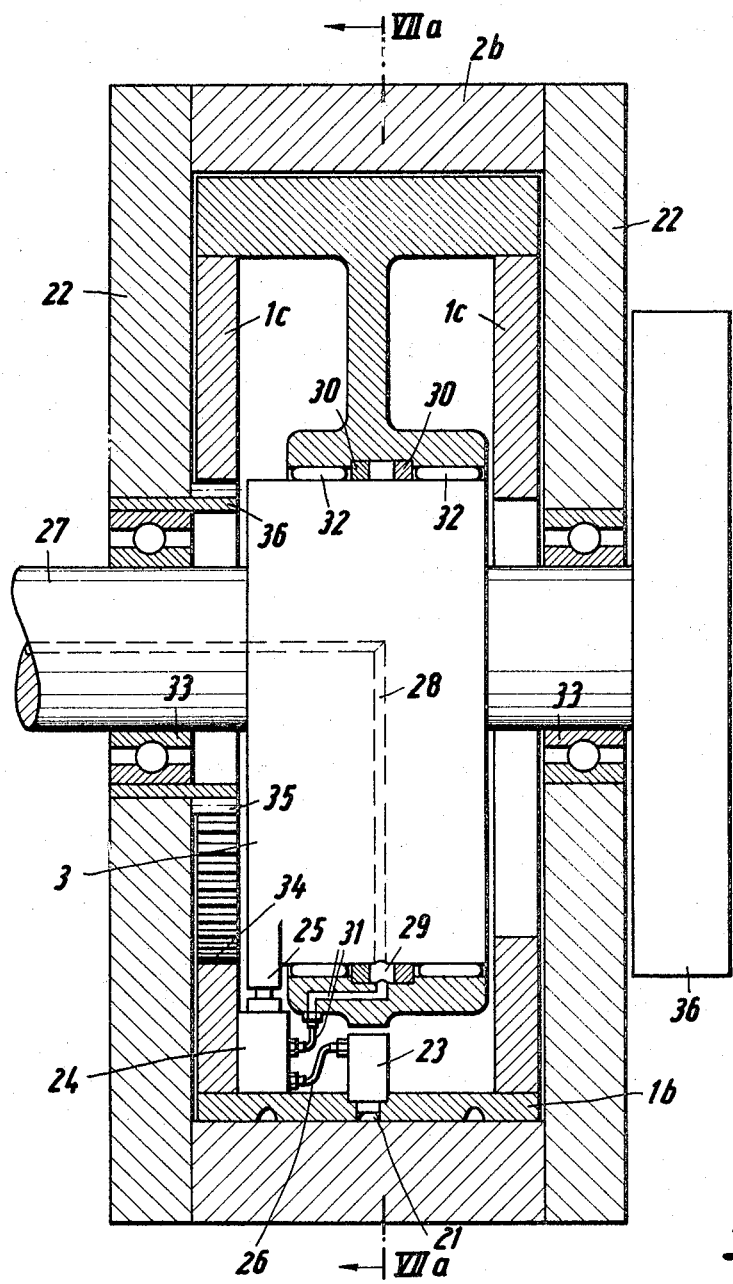

March 21, 1967  H. H. HAAS  3,310,042
ROTARY PISTON INTERNAL COMBUSTION ENGINE
Filed Nov. 29, 1962  8 Sheets-Sheet 5
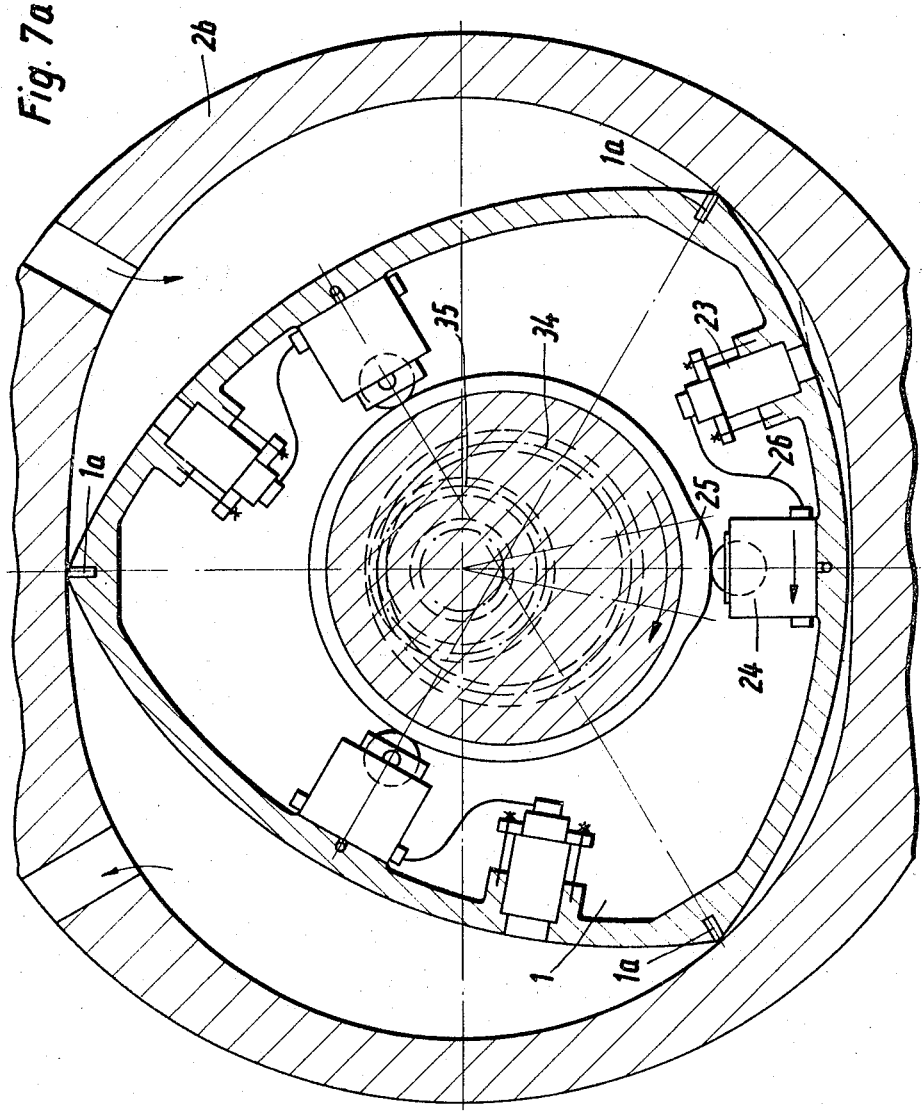
Inventor:
Herbert H. Haas
By Walter Bulun Inventor:
Herbert H. Haas
By Walter Becky

United States Patent Office 3,310,042
Patented Mar. 21, 1967

3,310,042
ROTARY PISTON INTERNAL COMBUSTION ENGINE
Herbert H. Haas, Bergisch, Gladbach, Germany, assignor to Klöckner-Humboldt-Deutz Aktiengesellschaft, Cologne, Germany
Filed Nov. 29, 1962, Ser. No. 241,115
8 Claims. (Cl. 123—8)

The present invention relates to a rotary piston internal combustion engine, preferably but not exclusively, to a circular piston internal combustion engine with inner mixture formation by injection of the fuel into the combustion chamber. The invention concerns, more particularly, an engine of the above-mentioned type in which the engine body surrounding the inner rotor and together with the latter defining working chambers, in the plane of the rotor comprises a multi-arch inner confining surface with at least two axis-near zones or lobe sections, while the inner rotor eccentrically located at the engine body has in its enveloping curved surface at least three axis-parallel crests or zenith edges.

With rotary piston internal combustion engines of the above-mentioned type, considerable success has been obtained. It has recently been possible, for the first time, to develop such rotary piston internal combustion engines for a longer period of operation. The main difficulties encountered with a satisfactory realization of a rotary piston internal combustion engine consists in the sealing of the working chambers, especially of the combustion chamber. In view of this situation, a rotary piston internal combustion engine has been developed in which the inner rotor is designed corresponding to the inner enveloping curve of an epitrochoid. The thus designed inner rotor consequently works on an engine body whose running surface has a multi-arch inner confining surface with at least two axis-near zones. As is the case with a circular piston internal combustion engine, the engine body may be stationary, however, as is the case with a rotary piston internal combustion engine, the engine body may also rotate in the same direction of rotation as the inner rotor but at a higher angular velocity.

The heretofore known rotary piston internal combustion engines of the type involved operate as gasoline engines. They are therefore equipped with a carburetor which, outside the working chambers, produces a ready combustible fuel-air mixture which is then supplied to the working chambers of the rotary piston internal combustion engine. In these working chambers, the said fuel-air mixture is in conformity with the four-cycle method customary with reciprocable piston engines, precompressed and is subsequently ignited in the combustion chamber by an electric sparkplug. While rotary piston internal combustion engines of this type have been made to work satisfactorily, efforts are entertained to operate rotary piston internal combustion engines also with inner mixture formation, as is the case with reciprocable piston fuel injection internal combustion engines, especially diesel engines.

When attempting to apply to rotary piston internal combustion engines the findings made in connection with reciprocable piston fuel injection internal combustion engines concerning the formation of a combustible fuel-air mixture in the interior of the combustion chamber, it quickly becomes evident that the shape of the combustion chamber of the above-mentioned rotary piston internal combustion engine fundamentally differs from the customary shape of combustion chambers of reciprocable piston fuel injection internal combustion engines. In connection with said last-mentioned instance, it is well kown that it is generally expedient to give the combustion chamber as small a surface as possible. From this principle, fuel injection reciprocable piston internal combustion engines deviated only insofar as it is necessary, by the shape of the combustion chamber, to produce an air movement aiding in the mixture formation in the combustion chamber.

With heretofore known rotary piston internal combustion engines working as gasoline engines, the combustion chamber extends over a third portion of the circumference of the inner rotor. Near the end of the pre-compression, due to the fact that the axis-near zone of the inner confining surface of the engine body which is adjacent the combustion chamber extends to the enveloping curved surface of the inner rotor, two rather flat partial combustion chambers are formed which, when viewing in circumferential direction of the inner rotor, are located one behind the other and extend over a third of the circumference of the inner rotor. As to the volume of said partial combustion chambers, the said two partial combustion chambers making up the total combustion chamber have a surface of such magnitude that it could hardly be exceeded. Consequently, the combustion chamber has a shape which, prima facie, appears disadvantageous for the inner mixture formation.

It would therefore appear expedient, in order to arrive at advantageous shapes for the combustion chamber, to select other inner contours for the engine housing while discarding, to a certain extent, the favorable conditions with regard to the sealing of the working chambers as they are obtained with heretofore known rotary piston internal combustion engines. However, when following this idea, it has been found that great difficulties are encountered in mastering the kinematic conditiones, i.e., difficulties which occur in the necessary drives between the engine housing and the inner rotor. With heretofore known rotary piston internal combustion engines, the kinematic conditions are rather favorable. The drive between the engine housing and the inner rotor is in this instance not loaded by forces having their origin in the combustion of the fuel.

From the above it will therefore be evident that the heretofore known rotary piston internal combustion engine has important advantages, and therefore it is an object of the present invention to provide a rotary piston internal combustion engine which, when employing an inner mixture formation, will also work satisfactorily.

It is a further object of this invention to provide a rotary piston internal combustion engine as set forth in the preceding paragraph in which the combustion of an internally formed mixture will be greatly improved.

It is a further object of this invention to provide a rotary piston internal combustion engine of the type set forth above which can be started rather easily.

These and other objects and advantages of the invention will appear more clearly from the following specification in connection with the accompanying drawings, in which:

FIGURE 1 is a diagrammatic vertical cross-section through a circular piston internal combustion engine with inner mixture formation, according to the present invention;

Figure 4:
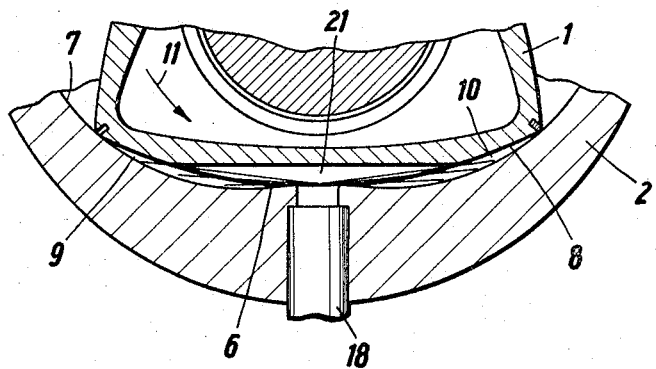
Figure 5:
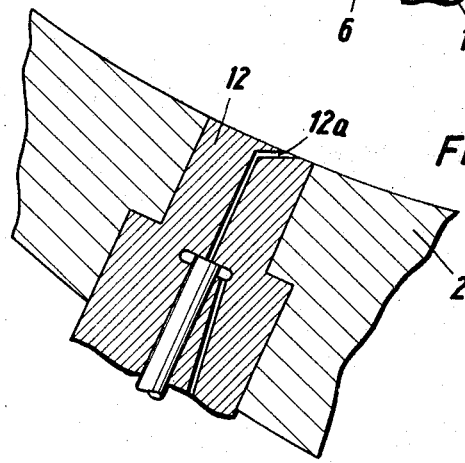
Figure 6:
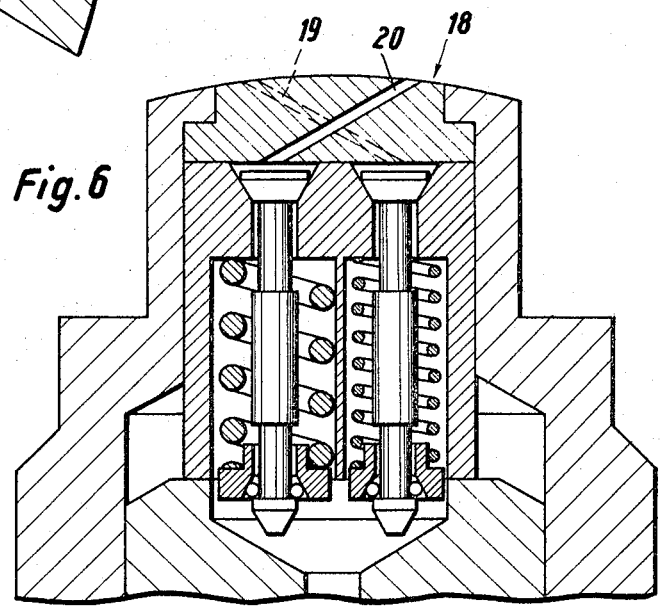
Figure 8:
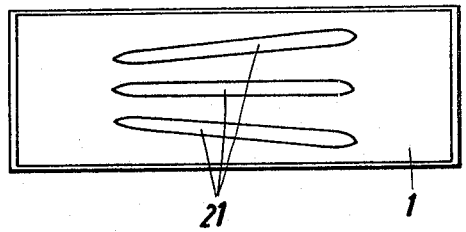
Figure 9:
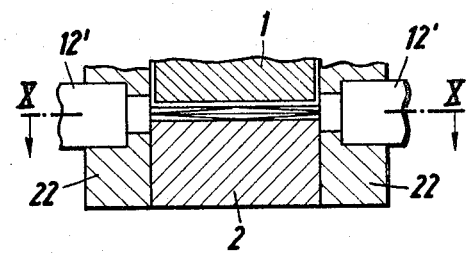
Figure 10:
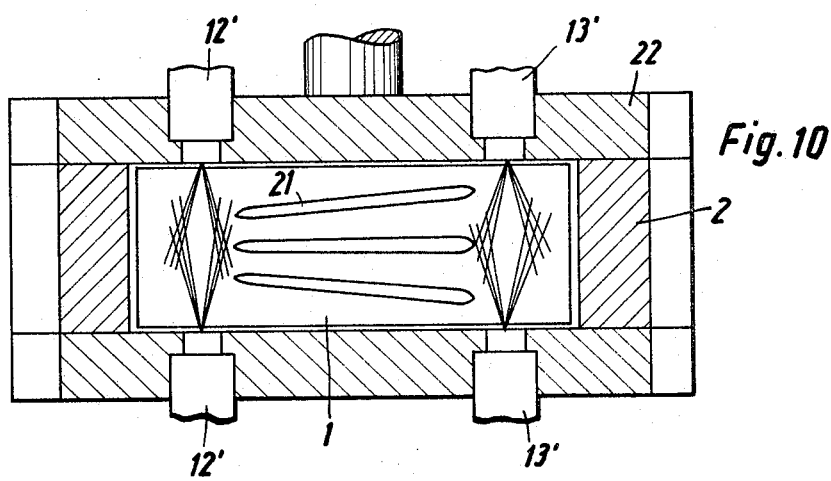

FIGURES 2, 3 and 4 respectively illustrate slight modifications over FIGURE 1 with regard to the arrangement of the fuel injection nozzles relative to the combustion chambers;

FIGURE 5 illustrates a longitudinal section through a portion of a fuel injection nozzle as it may be employed in connection with the present invention;

FIGURE 6 illustrates a section through a portion of a modified fuel injection nozzle for use in connection with the present invention;

FIGURE 7 is a diagrammatic longitudinal section through a circular piston internal combustion engine according to the invention;

FIG. 7a is a section taken along the line VIIa—VIIa of FIG. 7 but on a slightly smaller scale than the latter;

FIGURE 8 illustrates a detail of the rotor as it is employed in connection with the engine shown in the drawings;

FIGURE 9 is a transverse section through a combustion chamber of a circular piston internal combustion engine of the invention;

FIGURE 10 represents a section taken along the line X—X of FIGURE 9.

Figure 11:
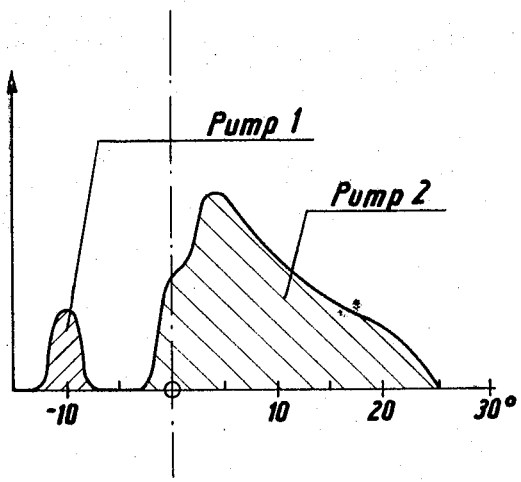
Figure 12:
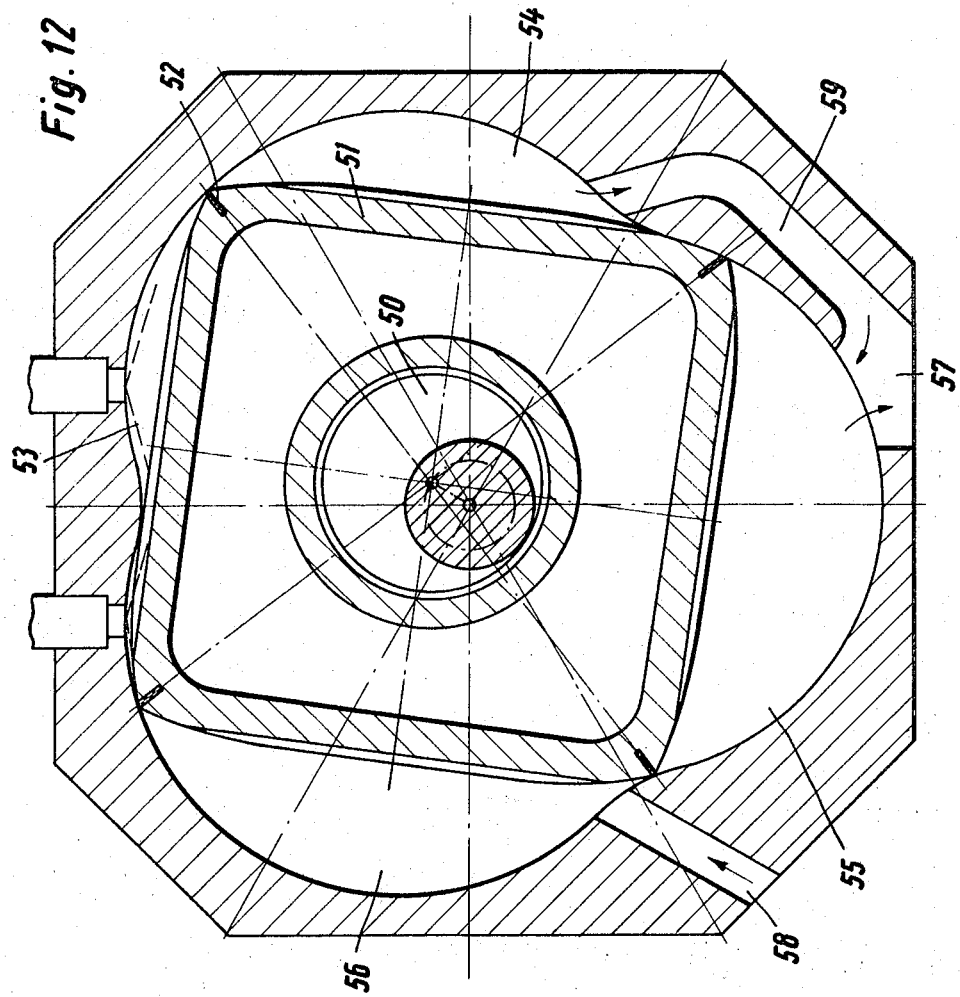

FIG. 11 diagrammatically illustrates a fuel injection characteristic as it may be employed in connection with the present invention when using two injection nozzles;

FIG. 12 is a section through a further embodiment of a rotary piston machine according to the present invention, in which the basic epitrochoid is a three-arched epitrochoid while the inner rotor is a four-edge rotor.

The objects outlined above have been realized according to the present invention primarily in that of the two partial combustion chambers which, near the end of the pre-compression, are formed by the axis-near zone of the inner confining surface of the engine body extending to the enveloping surface of the inner rotor, one serves as pre-combustion chamber in which the ignition of the fuel is brought about, for instance, by pre-injection. This suggestion, according to the invention, is based on the finding that the heretofore encountered difficulties with regard to the large surface of the combustion chamber can be overcome when exploiting for the combustion the subdivision of the total combustion chamber as it occurs near the end of the pre-compression. When, in conformity with the invention, effecting a pre-combustion in one of the partial combustion chambers, it has been found that in view of the pressure increase occurring during the pre-combustion, the burning fuel-air mixture which, following the initiation of the pre-combustion, flows from the pre-combustion chamber to the adjacent main combustion chamber, will considerably better and more intimately mix with the fuel injected into the main combustion chamber and with the combustion air therein. In other words, this intermixture with the combustion air and the injected fuel is considerably better than can be obtained by the injection effect alone. This result is hardly possible with the flat combustion chamber extending over the third portion of the circumference of the inner rotor, particularly because a strong air movement in the combustion chamber is lacking. Such strong air movement or turbulence will, however, be obtained according to the present invention, by the blowing force of the pre-ignited fuel oil mixture.

Referring now to the drawings in detail and FIG. 1 thereof in particular, the rotary piston internal combustion engine illustrated therein represents a circular piston engine with an inner rotor 1 rotatable in a stationary engine body 2. While with a circular piston engine it is, structurally, particularly simple to arrange the necessary elements for the internal mixture formation, it is to be expressly understood that the invention is not limited to circular piston engines but can as well be applied to rotary piston internal combustion engines in which the inner rotor is surrounded by an outer rotor.

As will be evident from the drawing, the engine body 2 together with the inner rotor 1 defines working chambers including the combustion chamber of the engine. The circular piston engine shown in FIG. 1 has an inner rotor 1 the enveloping curve of which is designed as epitrochoid. The inner confining surface of the engine body 2 thus represents the epitrochoid. However, it should be noted that the invention is not limited to the employment of an epitrochoid as basic curve for creating a rotary piston internal combustion engine but is also applicable to other basic curves, for instance, when the inner rotor designed in conformity with a hypotrochoid rotates in an engine body the inner confining surface of which is designed in conformity with the outer enveloping curve of the hypotrochoid.

More specifically, the rotary piston engine of FIG. 1 has as basic curve a two-arch epitrochoid. However, if desired, also a three-arch epitrochoid may be selected as basic curve. In the last-mentioned instance, the inner rotor would have four edges and consequently, would, together with the engine body, form four working chambers of changing volume. With a rotary piston internal combustion engine of this type, the outlet opening may, in a manner known per se, be designed as overflow passage which will establish communication between the respective working chamber of the least volume with the working chamber in its expansion stage. In this way, an extended expansion of the burned gases and a better exploitation of the energy will be realized.

An arrangement of the type set forth in the preceding paragraph is shown in FIG. 12 and has an inner rotor 51 rotatably journalled on an eccentric 50. The inner rotor 51 has four edges 52 in conformity with the inner enveloping curve of a three-arched epitrochoid. In this way four working chambers 53, 54, 55 and 56 of varying volume are obtained. Chambers 53, due to the fact that an axis-near zone extends to the enveloping surface of the inner rotor, consists of two partial combustion chambers into which lead the fuel injection nozzles, said two partial combustion chambers representing the main combustion chambers. The partial combustion chamber 55 communicates with the outlet 57. The inlet 58 leads into the partial combustion chamber 56. With rotary piston internal combustion engines of this type the outlet 57 may through a passage 59 communicate with the chamber 54 in order that an extended expansion effect of the pressure gases will take place in chamber 54 and not the subsequent recompression.

Figure 1A:
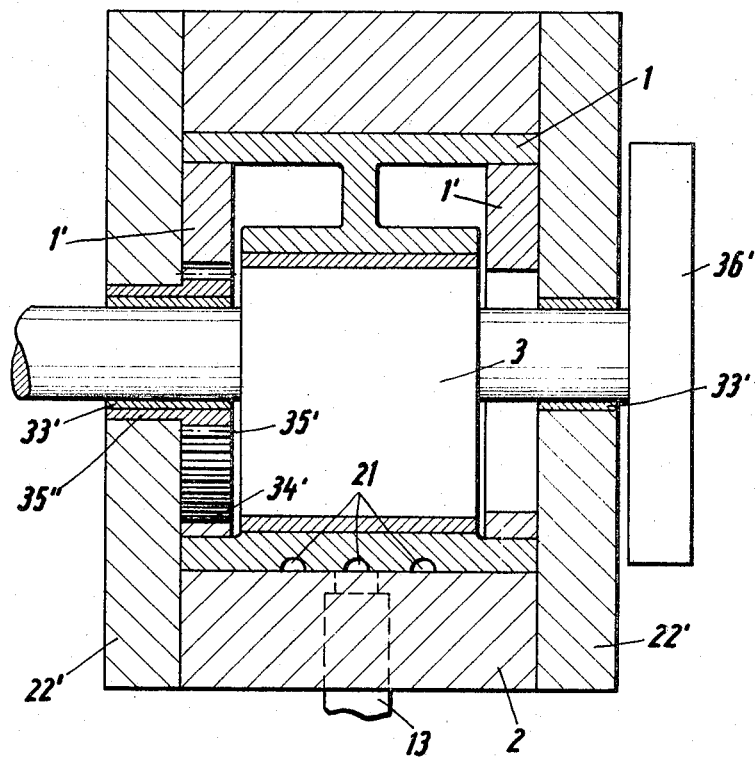
FIG. 1a is a section taken along the line Ia—Ia of FIG. 1.

As will be evident from FIG. 1a, the inner rotor is composed of a plurality of parts, namely the main body 1 and the lateral part 1'. FIG. 1a also shows the teeth for the rotary movement of the inner rotor 1 on the eccentric 3. More specifically, the inner rotor is provided with inner teeth 34' which mesh with and roll on the stationary teeth 35' fixedly connected to the stationary side walls 22' of the stationary engine body 2. The eccentric shaft is provided with a coupling flange 36' for conveying the output. The eccentric 3 or shaft carrying the same is journalled in the side walls 22' of the engine body by means of slide bearings 33'. The bushings 35" of the stationary gear 35' has journalled therein the bearing bushing 33'.

With the rotary piston engine involved in the present invention, the engine body 2 has a multi-arch inner confining surface with at least two axis-near zones, whereas the inner rotor 1 eccentrically located in the engine body 2, has its enveloping surface provided with at least three axis-parallel crests or zenith edges 1a. The inner rotor 1 is journalled on an eccentric 3. The rotary movement of the inner rotor is transferred to the eccentric shaft by a gear system. Such gear system is shown for instance in FIG. 7 in which the inner rotor 1b, 1c is provided with teeth 34 which are in meshing and rolling engagement with teeth 35 of a bushing 36 which is fixedly connected to the stationary engine body portion 22.

The rotary piston engine according to the invention is a four-cycle engine. The openings for the charge change are provided in the engine body 2. More specifically, the inlet opening is designated with the reference numeral 4 whereas the outlet opening is designated with the reference numeral 5. Due to the fact that near the end of the pre-compression the axis-near zone 6 of the inner confining surface 7 of the engine body 2 extends to the enveloping curve 8 of the inner rotor 1, two partial combustion chambers 9 and 10 are formed which, according to FIG. 1, are arranged one behind the other when looking in the direction of rotation of the inner rotor 1, as indicated by the arrow 11. In conformity with a further development of this invention, the partial combustion chamber 9 which, when looking in the direction of rotation of inner rotor 1 is the rear one of said two partial combustion chambers, forms the pre-combustion chamber. It is in this pre-combustion chamber 9 that the ignition of the fuel by pre-injection, will be effected. This arrangement is particularly advantageous because this partial combustion chamber 9 decreases in volume from the end of the pre-compression more and more in view of the movement of the inner rotor until the rear (when looking in the direction of rotation 11) axis-parallel crest 1a of the inner rotor passes by the axis-near zone adjacent the combustion chamber of the inner confining surface of the engine body 2. From this instant on, a uniform combustion chamber is formed in which the combustion is completed and the expansion starts.

For purposes of injecting the fuel, there are provided two injection nozzles 12 and 13. Of these injection nozzles, the injection nozzle 12 injects into the pre-combustion chamber 9 a small portion of fuel with regard to the total quantity of fuel to be injected per each working cycle. The other injection nozzle 13 injects the larger remaining quantity of fuel into the main combustion chamber 10. The arrangement of two injection nozzles advantageously makes possible a desired adaptation of the fuel distribution to the two partial combustion chambers. In particular, with rotary piston internal combustion engines with larger fuel chambers into which also larger quantities of fuel have to be injected, it is advantageous to employ a plurality of injection nozzles. For supplying fuel to the two injection nozzles, two fuel injection pumps may be provided communicating with the injection nozzles 12 and 13.

It is advantageous to arrange the fuel injection nozzles 12 and 13 at the start of the partial combustion chambers 9 and 10—when looking in the direction of rotation 11 of the inner rotor—so that the fuel is injected into the chambers 9 and 10 in the direction of rotation of the inner rotor, i.e., in longitudinal direction of said chambers 9 and 10, as illustrated in FIG. 1.

For purposes of facilitating the starting of cold rotary piston engines of the type involved, according to the present invention, an ignition aid may be provided adjacent the pre-combustion chamber. Thus, according to FIG. 1, the engine body 2 is adjacent the pre-combustion chamber 9 provided with a cutout 37a so that a thin-walled portion 37 adjacent the pre-combustion chamber, is formed. This thin-walled portion 37 may be heated by an electric coil 38. Such an arrangement has the advantage that the axis-parallel crests 1a of the inner rotor do not have to pass over hollow chambers in the multi-arch inner confining surface of the engine body 2.

For purposes of facilitating the starting, also the injection of an easily burnable ignition fuel into the pre-combustion chamber, may be resorted to. In general, it is advisable to effect the injection of the fuel into the pre-combustion chamber always in an air distributed manner and, more specifically, into the hot air core of the combustion air in the pre-combustion chamber. This will greatly facilitate the starting of the ignition, especially when the engine is cold.

While according to FIG. 1 the injection nozzles 12 and 13 are arranged at certain wall portions of the engine body 2, also other arrangements of the injection nozzles are possible. Thus, for instance, FIG. 2 shows a modification according to which two fuel injection nozzles 14 and 15 are, when looking in the direction of rotation 11 of the inner rotor 1 respectively, located at the ends of the combustion chambers 9 and 10 so that the fuel is injected in a direction counter to the direction of rotation of the inner rotor, in longitudinal direction of the combustion chambers.

According to FIG. 3, the injection nozzles 16 and 17 are arranged midway between the ends of the combustion chambers 9 and 10 and each injects the fuel in opposite direction, as clearly shown in FIG. 3.

According to the modification of FIG. 4, the injection nozzle 18 is located between the two partial combustion chambers 9 and 10 and injects the fuel into chamber 9 in a direction counter to the direction of rotation 11 of the inner rotor, whereas the fuel is injected into chamber 10 in the direction of rotation 11 of the rotor 1. The injection nozzle 18 represents a double injection nozzle comprising a lower loaded nozzle portion for injection of the fuel into the combustion chamber 9 and a higher loaded injection nozzle portion for injection of the fuel into the main combustion chamber 10.

A fuel injection nozzle, as may be employed in connection with the arrangement of FIG. 1, is illustrated on an enlarged scale in FIG. 5. As will be seen therefrom, the nozzle passage 12a of the nozzle 12 is directed in the direction of rotation 11 of the inner rotor 1.

The double fuel injection nozzle 18 of FIG. 4 is shown on an enlarged scale in FIG. 6. With reference to FIG. 6, the nozzle 18 comprises a lower loaded nozzle 19 for fuel injection into the pre-combustion chamber 9 and also comprises a higher loaded nozzle 20 for fuel injection into the main combustion chamber 9.

With the heretofore known rotary piston internal combustion engine, the enveloping surface of the inner rotor comprises grooves or passages for interconnecting the two partial combustion chambers. The arrangement according to the present invention is likewise provided with such grooves or passages 21 which, however, in conformity with the present invention, are preferably designed so as to diverge in the manner of rays, for instance in the direction of flow of the burning fuel-air mixture, as shown in FIG. 8. These grooves or passages 21 greatly aid in effecting a good intermixture of the fuel-air mixture, which after initiation of the pre-combustion, passes from the pre-combustion chamber 9 into the main combustion chamber 10 for intermixture with the combustion air in said main combustion chamber 10. In this way, the course of combustion can be favorably influenced. It is to be borne in mind, however, that FIG. 8 merely shows an example according to which it is possible to influence the course of the total combustion of the fuel in a favorable manner. Instead of grooves 21 also, for instance, passages may be provided which need not necessarily have a uniform cross-section. It is possible that the cross-section of such passages increases in a nozzle-like manner in the direction toward the main combustion chamber, as is the case, for instance, with the two outermost grooves 21 provided in the enevolping surface 8 of the inner rotor 1 and connecting the two partial combustion chambers 9 and 10 to each other. The fuel injection nozzle 18 is located opposite to such groove 21 whereby it is made possible that its nozzles 19 and 20 inject fuel into the combustion chambers 9 and 10.

While according to FIGS. 1 to 4, the fuel injection nozzles are introduced into the combustion chambers through the circumferential wall of the engine body 2, the fuel injection nozzles may also be introduced through the sidewalls 22 of the engine body 2, as shown in FIGS. 9 and 10. In this instance, the arrangement is preferably such that the fuel jets of oppositely located fuel injection nozzles intersect or cross. The mutual impacting of fuel jets upon each other advantageously aids the intermixture of the fuel with the combustion air.

FIG. 7 shows a rotary piston internal combustion engine according to the invention in which both the rotor 1b and the engine body 2b are rotatable, and in which the fuel injection nozzle 23 leads into the combustion chamber from the interior of the inner rotor 1b through the enveloping curve forming the wall thereof. Such an arrangement is particularly advantageous for rotary piston engines in which the engine body forms an outer rotor, as illustrated in FIG. 7.

The rotary piston engine of FIG. 7 is likewise provided with a pre-combustion chamber 9 and a main combustion chamber 10, as described in connection with FIG. 1. Near the end of the pre-compression, the fuel injection nozzle 23 of that axis-near zone which is located adjacent the combustion chamber will be loaded opposite the inner confining surface of the engine body 2b. The nozzle 23 leads into a groove 21 interconnecting the two partial combustion chambers and provided in the enveloping surface of the inner rotor 1b and is designed as double nozzle, for instance, of the type shown in FIG. 6. If desired, the fuel injection nozzle 23 may therefore, similar to the fuel injection nozzle of FIG. 4, supply both partial combustion chambers 9 and 10 with fuel.

The fuel injection nozzle 23 receives its fuel from a fuel injection pump 24 arranged in the inner rotor 1b (FIGS. 7, 7a) and actuated by one of the cams 25 arranged on the eccentric 3. The fuel pressure conduit between fuel injection pump 24 and fuel injection nozzle 23 is designated with the reference numeral 26. The fuel injection pump 24 draws in fuel through a passage 28 which extends through the eccentric shaft 27 and the eccentric 3. Passage 28 leads into an annular chamber 29 of the inner rotor 1b which is at both sides sealed against eccentric 3 by seals 30. From the annular chamber 29, the fuel passes through a conduit 31 to the fuel injection pump 24. FIG. 7a also shows the inlet I and the outlet O.

As will be seen from FIG. 7, the inner rotor 1 is rotatably journalled on the eccentric 3 by means of needle bearings 32. The engine body 2b is rotatably journalled on the eccentric shaft 27 by ball bearings 33. As will furthermore be seen from FIG. 7, the sidewalls 1c of the inner rotor 1b are provided with inner teeth 34. A bushing 36 which is fixedly connected in any convenient manner to the sidewalls 22 of the outer rotor 2b is provided with outer teeth 35 which are in meshing and rolling engagement with the teeth 34. For drawing off power from the eccentric shaft 27, the latter is provided with a coupling flange 36.

It is, of course, self-understood that while FIG. 7 shows only one nozzle 23, actually in each flank of the enveloping curve of the inner rotor 1b there is provided a fuel injection nozzle 23. Each fuel injection nozzle may, as shown in FIG. 7, have associated therewith a fuel injection pump. However, arrangements are also possible in which all of the fuel injection nozzles are supplied with fuel from a single fuel injection pump.

When one injection nozzle is provided, it is intended that the same injects fuel into one of the partial combustion chambers, advantageously into that partial combustion chamber which when looking in the direction of rotation of the inner rotor is located in the rear so that this partial combustion chamber will serve as pre-combustion chamber. The actuation of the fuel injection pump is effected by an ordinary cam.

When two fuel injection nozzles are provided, one of said injection nozzles will with regard to the total quantity of fuel to be injected per working stroke inject a smaller quantity into the said pre-combustion chamber whereas the other injection nozzle will inject the larger quantity of fuel into the main combustion chamber. As pre-combustion chamber, also in this instance, will serve the partial combustion chamber which, when looking in the direction of rotation of the inner rotor, is located in the rear. Each fuel injection nozzle has a separate injection pump associated therewith which naturally also is actuated by a control cam of its own. The control cams of both fuel injection pumps are offset with regard to each other so that one fuel injection pump will be effective ahead of the other one. FIG. 11 diagrammatically illustrates such fuel injection characteristic.

In the preceding portion of the present specification, reference is made to an air distributed mixture of the fuel with the combustion air. However, it is also possible to effect the building up of the fuel-air mixture in the main combustion chamber 10 by depositing the fuel in said main combustion chamber in the form of a film on the wall of the inner rotor which forms a portion of the combustion chamber wall. This deposit of a fuel film may be effected in the direction of rotation of the inner rotor or also in opposite direction of rotation thereto. When the film deposit is effected in the direction of rotation of the inner rotor, the building up of the fuel-air mixture in the main combustion chamber is aided by the burning fuel-air mixture which, in the same direction passes from the pre-combustion chamber into the main combustion chamber. More specifically, due to this burning fuel-air mixture passing from the pre-combustion chamber into the main combustion chamber, the fuel film deposit in the main combustion chamber is gradually detached from the wall of the inner rotor, intermixed, and burned. In this connection, it is of particular importance that the wall of the inner rotor has a temperature level which lies within the range of the natural boiling temperature of the fuel. The importance of this fact is seen in that, in contrast to that wall portion of the inner confining surface of the engine body which is located adjacent the fuel chamber, with each combustion operation another portion of the enveloping surface of the inner rotor will confine the combustion chamber. The respective portion of the enveloping surface of the inner rotor which is adjacent the fuel chamber can easily be held at a temperature which lies below the thermic disintegration temperature but still within the boiling range of the fuel.

If the deposit of the fuel, when looking in the direction of rotation of the inner rotor, is effected at the front end of the main combustion chamber in a reflection-free manner, it is possible, in an advantageous manner, to employ for the film deposit of the fuel, the entire available surface of that portion of the enveloping surface of the inner rotor which is located at the main combustion chamber. It has been found, according to the present invention, that particularly in this respect, a rotary piston internal combustion engine has great advantages because it meets in almost ideal manner the requirements which have to be met for a wall distributed mixture of the fuel with the combustion air.

As will be evident from the above, the steps for initiating a pre-compression in the pre-combustion chamber 9 can easily be mastered. It may be repeated that the fundamental idea of the present invention consists in producing a pre-compression in the pre-combustion chamber. The invention will always be realized when employing means which initiate a pre-compression in the pre-combustion chamber because by such means, the respective difficulties are overcome which heretofore were encountered with the inner mixture formation of the fuel in a rotary piston engine of the type involved. By such means, it will always be easily possible to effect the inner mixture formation over the longitudinal extension of the combustion chamber.

It is, of course, to be understood that the present invention is, by no means, limited to the particular constructions shown in the drawings but also comprises any modifications within the scope of the appended claims. Thus, it is also possible to arrange a single fuel injection nozzle while the fuel injected thereby into the combustion chambers is ignited in the pre-combustion chamber through the intervention of a heat source for producing a pre-compression in the pre-combustion chamber. In such an instance, an effect will be obtained which is similar to the effect in reciprocable piston internal combustion engines operating with an antechamber and in which the fuel is injected by a single fuel injection nozzle into the empty chamber and through said antechamber through the throat thereof into the main combustion chamber. Such heat source may be provided in the form of a glow-plug.

What I claim is:

1. A rotary piston internal combustion engine, which comprises: a first engine member having a cavity therein with side walls and having an inner peripheral contour with a plurality of arched surfaces with at least two inwardly extending crests, a second engine member in said cavity having an arched outer contour with at least three outwardly extending crest means for engagement with said inner contour, one of said engine members being rotatable relative to the other engine member and defining therewith working chambers which vary in volume during a relative rotation of said engine members with regard to each other, said working chambers including a combustion chamber adapted during a rotation of one of said members relative to the other one of said members to be subdivided by one of said crests into two partial combustion chamber means, and means for injecting fuel into said partial combustion chamber means, said second engine member being provided with passage means establishing communication between said partial combustion chamber means and fanning out in the manner of rays.

2. A rotary piston engine according to claim 1, in which said passage means fan out in the direction of the flow of the fuel-air mixture from one partial combustion chamber means to the next partial combustion chamber means.

3. A rotary piston internal combustion engine, which comprises: a first engine member having a cavity therein with sidewalls and having an inner peripheral contour with a plurality of arched surfaces with at least two inwardly extending crests, a second engine member in said cavity having an arched outer contour with at least three outwardly extending crest means for engagement with said inner contour, one of said engine members being rotatable relative to the other engine member and defining therewith working chambers respectively varying in volume during a relative rotation of said engine members with regard to each other, said working chambers including a combustion chamber adapted during a rotation of one of said members relative to the other one of said members to be sub-divided by one of said crests into a pre-combustion chamber and into a main combustion chamber, and two fuel injection nozzles for respectively injecting a small quantity of fuel per working cycle into said pre-combustion chamber and a larger quantity of fuel per working cycle into said main combustion chamber.

4. A rotary piston engine according to claim 3, in which said nozzles are respectively arranged at one end of said combustion chambers and are designed for injecting fuel from said respective end into the respective combustion chamber pertaining thereto in the longitudinal direction of said respective chamber.

5. An arrangement according to claim 3, in which said first engine member has a cavity provided within the range of said pre-combustion chamber, and in which heating means is provided in said cavity for aiding the ignition of fuel in said pre-combustion chamber.

6. An arrangement according to claim 3, in which the fuel injected into said precombustion is a more easily inflammable fuel than the fuel injected into said main combustion chamber.

7. A rotary piston internal combustion engine, which comprises: a first engine member having a cavity therein with sidewalls and having an inner peripheral contour with a plurality of arched surfaces with at least two inwardly extending crests, a second engine member in said cavity having an arched outer contour with at least three outwardly extending crest means for engagement with said inner contour, one of said engine members being rotatable relative to the other engine member and defining therewith working chambers respectively varying in volume during a relative rotation of said engine members with regard to each other, said working chambers including a combustion chamber adapted during a rotation of one of said members relative to the other one of said members to be sub-divided by one of said crests into two partial combustion chamber means, and double nozzle means arranged in said first engine member within the range of a crest thereof for injecting fuel into said partial combustion chamber means, said double nozzle means comprising a first nozzle and a second nozzle for respectively injecting fuel into said partial combustion chamber means with said second nozzle being designed for injecting a larger quantity of fuel than said first nozzle, said second nozzle supplying fuel to that one of said partial combustion chamber means which when looking in the direction of rotation of said second engine member relative to said first engine member represents the forwardly located partial combustion chamber means.

8. A rotary piston internal combustion engine, which comprises: a first engine member having a cavity therein with sidewalls and having an inner peripheral contour with a plurality of arched surfaces with at least two inwardly extending crests and also being provided with oppositely located side walls, a second engine member arranged within said cavity of said first engine member and having an arched outer contour with at least three outwardly extending crest means for engagement with said inner contour, one of said engine members being rotatable relative to the other engine member and defining therewith working chambers respectively varying in volume during a relative rotation of said engine members with regard to each other, said working chambers including a combustion chamber adapted during a rotation of one of said members relative to the other one of said members to be sub-divided by one of said crests into a pre-combustion chamber and into a main combustion chamber, and fuel injection nozzles arranged in said side walls for injecting fuel into said pre-combustion and main combustion chambers in opposite direction to each other so that the fuel jets in each of said combustion chambers pass in opposite direction to each other.

References Cited by the Examiner

UNITED STATES PATENTS

| | | | |
|---|---|---|---|
| 1,448,215 | 3/1923 | Hasbrouck. | |
| 2,283,433 | 5/1942 | Gross. | |
| 2,709,425 | 5/1955 | Kuepfer et al. | 123—187.5 |
| 2,988,065 | 6/1961 | Wankel et al. | 123—8 |
| 3,012,550 | 12/1961 | Paschke | 123—8 |
| 3,174,466 | 3/1965 | Scherenberg | 123—8 |

OTHER REFERENCES

Wankel et al.: Bauart und gegenwartiger Entwicklungsstand einer Trochoiden-Rotationskolbenmaschine In MTZ, 21(2); pp. 33–45. February 1960.

MARK NEWMAN, *Primary Examiner.*

JOSEPH H. BRANSON, Jr., KARL J. ALBRECHT,
*Examiners.*

F. T. SADLER, *Assistant Examiner.*